US00RE44133E

(19) United States
(12) Reissued Patent
Moyer et al.

(10) Patent Number: US RE44,133 E
(45) Date of Reissued Patent: Apr. 9, 2013

(54) FIXED OPERATING FREQUENCY INVERTER FOR COLD CATHODE FLUORESCENT LAMP HAVING STRIKE FREQUENCY ADJUSTED BY VOLTAGE TO CURRENT PHASE RELATIONSHIP

(75) Inventors: James C. Moyer, San Jose, CA (US); Timothy J. Rust, Fremont, CA (US)

(73) Assignee: Monolithic Power Systems, Inc., San Jose, CA (US)

(21) Appl. No.: 12/617,924

(22) Filed: Nov. 13, 2009

Related U.S. Patent Documents

Reissue of:
(64) Patent No.: 7,294,974
Issued: Nov. 13, 2007
Appl. No.: 11/060,237
Filed: Feb. 16, 2005

U.S. Applications:
(63) Continuation of application No. 10/677,612, filed on Oct. 2, 2003, now Pat. No. 6,919,694.

(51) Int. Cl.
*G05F 1/00* (2006.01)

(52) U.S. Cl. ..... 315/291; 315/194; 315/224; 315/276; 315/209 R; 315/307; 315/DIG. 7

(58) Field of Classification Search ..... 315/209 R, 315/194, 142, 224, 244, 291, 276, 307, DIG. 5, 315/DIG. 7; 363/16, 17, 24, 41, 132
See application file for complete search history.

(56) References Cited

U.S. PATENT DOCUMENTS

| | | | |
|---|---|---|---|
| 4,085,300 | A | 4/1978 | MacKenzie et al. |
| 4,277,728 | A | 7/1981 | Stevens |
| 4,504,895 | A | 3/1985 | Steigerwald |
| 4,541,041 | A | 9/1985 | Park et al. |
| 4,672,528 | A | 6/1987 | Park et al. |
| 4,727,469 | A | 2/1988 | Kammiller |
| 4,794,506 | A | 12/1988 | Hino et al. |
| 4,855,888 | A | 8/1989 | Henze et al. |
| 4,935,857 | A | 6/1990 | Nguyen et al. |

(Continued)

FOREIGN PATENT DOCUMENTS

| | | |
|---|---|---|
| EP | 1296542 | 3/2003 |
| EP | 1296542 A1 | 3/2003 |
| JP | 05-100552 | 4/1993 |

OTHER PUBLICATIONS

Andreycak, B., "Practical Considerations in High Performance MOSFET, IGBT, and MCT Gate Drive Circuits," Topic 6, Power Supply Design Seminar, SEM800, Unitrode Corp. (Sep. 1991).
Andreycak, Bill, Phase Shifted, Zero Voltage Transition Design Considerations and the UC3875 PWM Controller, Application Note, Unitrode Corporation, U-136A (1999).
Balogh, Laszio; The New UC3879 Phase-Shifted PWM Controller Simplifies the Design of Zero Voltage Transition Full-Bridge Converters; Unitrode Corporation, 1999.
Chen, W. et al; A Comparative Study of a Class of Full Bridge Zero-Voltage Switched PWM Converters; Virginia Polytechnic Institutes and State University; Blacksburg, Virginia, 1995.
Cosby, Jr., Melvin C. and R.M. Nelms, "A Resonant Inverter for Electronic Ballast Applications," IEEE Transactions on Industrial Electronics, vol. 41, No. 4, Aug. 1994.

(Continued)

*Primary Examiner* — Haiss Philogene
(74) *Attorney, Agent, or Firm* — Perkins Coie, LLP

(57) ABSTRACT

A method of driving a lamp that uses a DC to AC inverter that is connected to a primary winding of a transformer is disclosed. The inverter frequency is variable, and in one embodiment, may be controlled by a voltage controlled oscillator. Circuitry is included that monitors the phase relationship between a voltage across a secondary of the transformer and a current through the primary of the transformer. The circuitry monitors the phase relationship and adjusts the inverter frequency, such as by adjusting voltage controlled oscillator, so that the phase relationship is maintained at a predetermined relationship.

42 Claims, 8 Drawing Sheets

THE IDEA

VCO CONTROL LOGIC

U.S. PATENT DOCUMENTS

| | | | | |
|---|---|---|---|---|
| 4,952,849 | A | 8/1990 | Fellows et al. | |
| 4,988,920 | A | 1/1991 | Hoeksma | |
| 4,992,919 | A | 2/1991 | Lee et al. | |
| 5,105,127 | A | 4/1992 | Lavaud et al. | |
| 5,130,611 | A | 7/1992 | Johns | |
| 5,157,592 | A | 10/1992 | Walters | |
| 5,166,579 | A | 11/1992 | Kawabata et al. | |
| 5,270,620 | A | 12/1993 | Basch et al. | |
| 5,285,372 | A | 2/1994 | Huynh et al. | |
| 5,311,104 | A | 5/1994 | Antle | |
| 5,315,498 | A | 5/1994 | Berrios et al. | |
| 5,363,020 | A | 11/1994 | Chen et al. | |
| 5,384,516 | A | 1/1995 | Kawabata et al. | |
| 5,402,043 | A | 3/1995 | Nilssen | |
| 5,416,387 | A | 5/1995 | Cuk et al. | |
| 5,422,546 | A | 6/1995 | Nilssen | |
| 5,438,242 | A | 8/1995 | Simpson | |
| 5,438,497 | A | 8/1995 | Jain | |
| 5,438,498 | A | 8/1995 | Ingemi | |
| 5,442,540 | A | 8/1995 | Hua et al. | |
| 5,477,131 | A | 12/1995 | Gegner | |
| 5,481,160 | A | 1/1996 | Nilssen | |
| 5,481,449 | A | 1/1996 | Kheraluwala et al. | |
| 5,550,436 | A | 8/1996 | Houk | |
| 5,583,402 | A | 12/1996 | Moisin et al. | |
| 5,604,411 | A | 2/1997 | Venkitasubrahmanian et al. | |
| 5,615,093 | A | 3/1997 | Nalbant | |
| 5,619,402 | A | 4/1997 | Liu | |
| 5,642,065 | A | 6/1997 | Choi et al. | |
| 5,677,602 | A | 10/1997 | Paul et al. | |
| 5,694,007 | A | 12/1997 | Chen | |
| 5,712,533 | A | 1/1998 | Corti | |
| 5,719,474 | A | 2/1998 | Vitello | |
| 5,744,915 | A | 4/1998 | Nilssen | |
| 5,754,012 | A | 5/1998 | LoCascio et al. | |
| 5,781,418 | A | 7/1998 | Chang et al. | |
| 5,844,540 | A | 12/1998 | Terasaki | |
| 5,875,103 | A | 2/1999 | Bhagwat et al. | |
| 5,886,477 | A | 3/1999 | Honbo et al. | |
| 5,910,709 | A | 6/1999 | Stevanovic et al. | |
| 5,923,127 | A | 7/1999 | Keijser et al. | |
| 5,923,129 | A | 7/1999 | Henry | |
| 5,930,121 | A | 7/1999 | Henry | |
| 5,932,976 | A | 8/1999 | Maheshwari et al. | |
| 5,939,830 | A | 8/1999 | Praiswater | |
| 5,940,709 | A | 8/1999 | Chan | |
| 6,002,210 | A | 12/1999 | Nilssen | |
| 6,011,360 | A | 1/2000 | Gradzki et al. | |
| 6,016,052 | A | 1/2000 | Vaughn | |
| 6,108,215 | A | 8/2000 | Kates | |
| 6,114,814 | A | 9/2000 | Shannon et al. | |
| 6,198,234 | B1 | 3/2001 | Henry | |
| 6,226,196 | B1 | 5/2001 | Toshinari | |
| 6,259,615 | B1 * | 7/2001 | Lin | 363/98 |
| 6,316,881 | B1 | 11/2001 | Shannon et al. | |
| 6,348,755 | B1 | 2/2002 | Shimamura | |
| 6,639,367 | B2 | 10/2003 | Wells | |
| 6,683,422 | B1 | 1/2004 | Moyer | |
| 6,900,599 | B2 | 5/2005 | Ribarich | |
| 6,919,694 | B2 * | 7/2005 | Moyer et al. | 315/224 |
| 7,183,724 | B2 * | 2/2007 | Ball | 315/274 |
| 7,187,140 | B2 * | 3/2007 | Ball | 315/291 |
| 7,355,354 | B2 * | 4/2008 | Rust et al. | 315/291 |
| 7,825,605 | B2 * | 11/2010 | Zhang et al. | 315/224 |

OTHER PUBLICATIONS

Dixon, L., "Control Loop Design," Topic 7, Power Supply Design Seminar, SEM800, Unitrode Corp. (Sep. 1991).

Farrington, Richard et al; High Density Power-Hyrbrid Design of a Half-Bridge Multi-Resonant Converter; Virginia Polytechnic Institute and State University; Blacksburg, Virginia, 1990.

Fisher, R. A. et al; A Frequency/PWM Controlled Converter With Two Independently Regulated Outputs; GE Corporate Research and Development Center; Schenectady, NY, Apr. 1989.

Mammano, B, and M. Jordan, "Fixed-Frequency Resonant-Switched Pulse Width Modulation with Phase-Shifted Control," Topic 5, Power Supply Design Seminar, Unitrode Corp. (Sep. 1991).

Mammano, B, and M. Jordan, "Load Sharing with Paralleled Power Supplies," Topic 2, Power Supply Design Seminar, SEM800, Unitrode Corp. (Sep. 1991).

Nalbant, M.K., "A New and Improved Control Technique Greatly Simplifies the Design of ZVS Resonant Inverters and DC/DC Power Supplies," APEC 1995 Conf. Proceedings, pp. 794-701, vol. 2, Issue 0.

Pressman, Abraham I.; Switching Power Supply Design; McGraw-Hill 1991.

Redl, R., et al., "Optimum ZVS Full-Bridge DC/DC Convert er with PWM Phase- Shift Control : Analysis , Design Considerations, and Experimental Results," IEEE APEC, pp. 159-165, 1994.

Steigerwald, Robert L., "A Comparison of Half-Bridge Resonant Converter Topologies," IEEE Transactions on Power Electronics, vol. 3, No. 2, Apr. 1998.

Sum, K. Kit (editor); Recent Developments in Resonant Power Conversion; Intertec Communications Press; Summit Electronics, Inc., Highland, Illinois, 1988.

Takano, H, et al. "Feasible Characteristic Evaluations of Resonant PWM Inverter-Link DC-DC High-Power Converters using High-Voltage Transformer Parasitic Components," Proceedings of Applied Power Electronics Conference and Exposition (Dallas, TX), pp. 913-919, Mar. 1995.

Vlatkovic, V., et al., Small-Signal Analysis of the Phase-Shifted PWM Converter, IEEE Transactions on Power Electronics, vol. 7, No. 1, Jan. 1992, pp. 128-135.

Graf, Rudolf F., "Modern Dictionary of Electronics," Seventh Edition, p. 760; Newnes, 1999.

J. R. Coaton and A. M. Marsden, Lamps and Lighting, Joh Wiley & Sons, Inc. pp. 322-324, 1997.

Unitrode Corporation; Power Supply Design Seminar 1991.

Japanese Official Action for Japanese Patent Application No. 2004-029258. Japan Patent Office. Dispatched Jul. 24, 2006. 2 pages.

Andreycak, Bill, Phase Shifted, Zero Voltage Transition Design Considerations and the UC3875 PWM Controller, Application Note, Unitrode Corporation, U-136A (1997).

Coaton, J.R. and A.M. Marsden, Lamps and Lighting, Joh Wiley & Sons, Inc. pp. 322-324, 1999.

* cited by examiner

THE IDEA

VCO CONTROL LOGIC

FIXED OPERATING FREQUENCY INVERTER FOR COLD CATHODE FLUORESCENT LAMP HAVING STRIKE FREQUENCY ADJUSTED BY VOLTAGE TO CURRENT PHASE RELATIONSHIP

Matter enclosed in heavy brackets [ ] appears in the original patent but forms no part of this reissue specification; matter printed in italics indicates the additions made by reissue.

CROSS REFERENCE TO RELATED APPLICATION(S)

This Application is *a reissue application of U.S. patent application Ser. No. 11/060,237, filed Feb. 16, 2005, which is* a continuation of U.S. patent application Ser. No. 10/677,612, filed on Oct. 2, 2003, now U.S. Pat. No. 6,919,694 *each of* which is hereby incorporated by reference in its entirety.

FIELD OF THE INVENTION

The present invention relates to discharge lighting and, in particular, to efficiently supplying electrical power for igniting of a discharge lamp by sweeping to a strike frequency based on the phase relationship between the current and the voltage in the load.

BACKGROUND OF THE INVENTION

A discharge lamp, such as a cold cathode fluorescent lamp (CCFL), has terminal voltage characteristics that vary depending upon the immediate history and the frequency of a stimulus (AC signal) applied to the lamp. Until the CCFL is "struck" or ignited, the lamp will not conduct a current with an applied terminal voltage that is less than the strike voltage. Once an electrical arc is struck inside the CCFL, the terminal voltage may fall to a run voltage that is approximately ⅓ of the strike voltage over a relatively wide range of input currents. When the CCFL is driven by an AC signal at a relatively high frequency, the CCFL (once struck) will not extinguish on each cycle and will exhibit a positive resistance terminal characteristic. Since the CCFL efficiency improves at relatively higher frequencies, the CCFL is usually driven by AC signals having frequencies that range from 50 Kilohertz to 100 Kilohertz.

Driving a CCFL with a relatively high frequency square-shaped AC signal will produce the maximum useful lifetime for the lamp. However, since the square shape of an AC signal may cause significant interference with other circuits in the vicinity of the circuitry driving the CCFL, the lamp is typically driven with an AC signal that has a less than optimal shape such as a sine-shaped AC signal.

Most small CCFLs are used in battery powered systems, e.g., notebook computers and personal digital assistants. The system battery supplies a direct current (DC) voltage ranging from 7 to 20 Volts with a nominal value of about 12V to an input of a DC to AC inverter. A common technique for converting a relatively low DC input voltage to a higher AC output voltage is to chop up the DC input signal with power switches, filter out the harmonic signals produced by the chopping, and output a relatively clean sine-shaped AC signal. The voltage of the AC signal is stepped up with a transformer to a relatively high voltage, e.g., from 12 to 1500 Volts. The power switches may be bipolar junction transistors (BJT) or field effect transistors (MOSFET). Also, the transistors may be discrete or integrated into the same package as the control circuitry for the DC to AC converter.

In some prior art inverters, the inverter is a fixed frequency inverter that sweeps to the strike frequency based on sensing the current from the lamp. However, this approach may not be able to generate a high enough voltage to ignite a lamp. Alternatively, this approach may not be effective in mass produced devices or may miss resonance.

BRIEF DESCRIPTION OF THE DRAWINGS

The foregoing aspects and many of the attendant advantages of this invention will become more readily appreciated as the same becomes better understood by reference to the following detailed description, when taken in conjunction to with the accompanying drawings, wherein.

DETAILED DESCRIPTION OF THE INVENTION

As noted above, inverters for driving a CCFL typically comprise a DC to AC converter, a filter circuit, and a transformer. Examples of such circuits are shown in U.S. Pat. No. 6,114,814 to Shannon et al., assigned to the assignee of the present invention and herein incorporated by reference in its entirety. In addition, other prior art inverter circuits, such as a constant frequency half-bridge (CFHB) circuit or a inductive-mode half-bridge (IMHB) circuit, may be used to drive a CCFL. The present invention may be used in conjunction with any of these inverter circuits, as well as other inverter circuits. The disclosure herein teaches a method and apparatus for striking and supplying electrical power to a discharge lamp, such as a cold cathode fluorescent lamp (CCFL).

According to the present invention, the inverter will "sweep" to the strike frequency. Thus, a "fixed frequency" CCFL inverter that sweeps to strike frequency based on the phase relationship between the current and the voltage in the load is next described. The decision to sweep is independent of the feedback parameters from the lamp.

Figure 1:
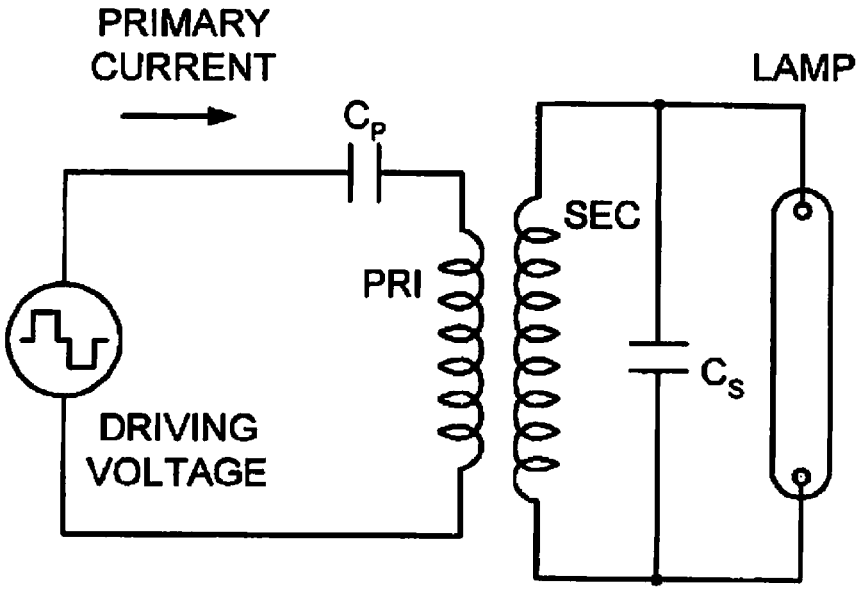
FIGURE 1 (PRIOR ART)
FIG. 1 is a schematic illustration of a tank circuit used for driving a cold cathode fluorescent lamp (CCFL).
Figure 2:
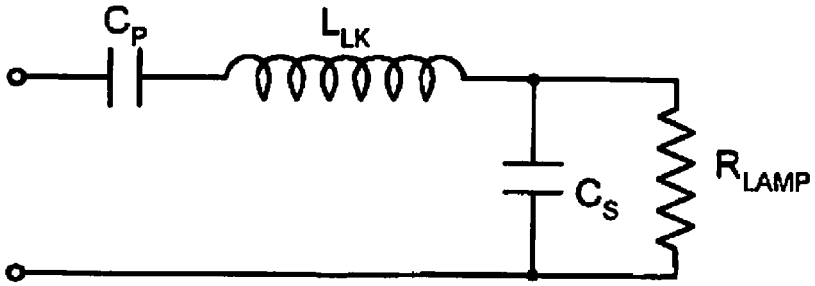
FIGURE 2 (PRIOR ART)
FIG. 2 is an equivalent circuit of the tank circuit of FIG. 1.

FIG. 1 shows a typical tank circuit that is used to drive a CCFL load. The tank circuit includes a driving voltage generator, such as a full bridge inverter, that can drive the primary of a transformer through a primary coupling capacitor $C_p$. The CCFL lamp is connected across the terminals of the secondary of the transformer (also referred to as the transformer secondary). Also connected across the terminals of the transformer secondary is a capacitive voltage divider and a parasitic and/or stray capacitance included in $C_s$. The circuit of FIG. 1 can be simplified into the equivalent circuit shown in FIG. 2 during operation in the frequency range of interest. The primary coupling capacitor $C_p$ and the transformer leakage inductance $L_{lk}$, in practice, determine the resonant frequency of the tank after the lamp has been struck. The lamp is represented as a resistance $R_{lamp}$.

Note that the transformer's magnetizing inductance is typically greater than ten times the leakage inductance in a well-designed, ungapped transformer. Therefore, the current through the magnetizing inductance (not shown) can be neglected to the first order. Further, after the lamp has been struck, the equivalent resistance of the lamp is typically one-third of the reactance of $C_s$, so that most of the secondary current flows through the lamp ($R_{lamp}$) and not through $C_s$. Note that both the lamp resistance and the secondary capacitance are shown transformed to the primary in FIG. 2.

Figure 3:
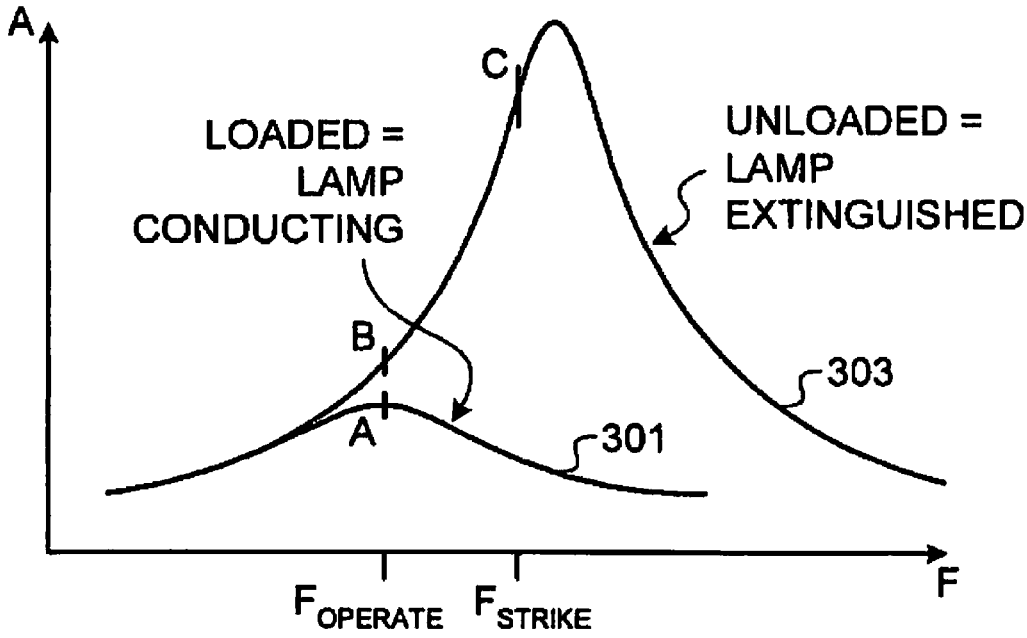
FIG. 3 shows the steady state response curve of the tank circuit as a function of frequency for a loaded and unloaded condition.

Turning to FIG. 3, the response of the tank circuit with the lamp conducting is shown as the lower curve 301. If the lamp is not conducting (either because it has not yet been struck or because it has been broken), there is practically no load on the tank circuit and the response is approximately represented by the upper curve 303. The parameter A is used generically in FIG. 3 to represent the magnitude of the response of the tank circuit.

Notice that the unloaded resonant frequency (where the curve hits its peak) of the tank circuit is higher than the loaded resonant frequency because all of the secondary current flows through $C_s$ when the lamp is not conducting. The equivalent tuning capacitance is the series combination of $C_p$ and $C_s$.

From the lower curve 301, the operating frequency of an inverter should be tuned to point A in FIG. 3 for the highest efficiency after the lamp has been struck. Unfortunately, it is often not possible to generate enough voltage across the secondary of the transformer at this same operating frequency A (same as point B in FIG. 3) to guarantee that the lamp will strike. Therefore, it is necessary to increase the frequency at which the lamp is struck in order to guarantee an adequate strike voltage across the lamp to ignite the lamp. Thus, there are two problems that must be addressed. First, the unloaded resonant frequency of the tank circuit must be found in order to strike the lamp. Second, and relatedly, the control circuitry must be able to determine when to search for the strike frequency.

Figure 4:
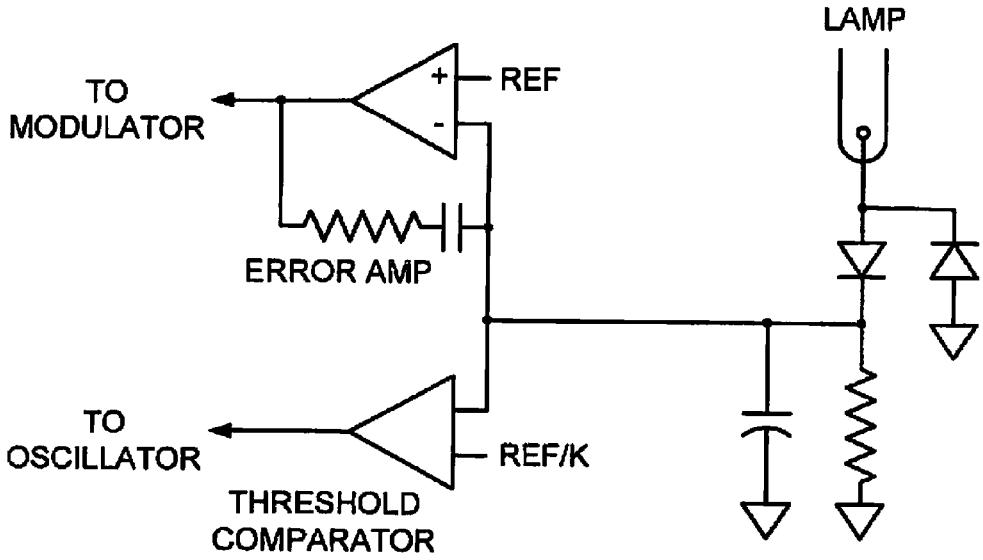
FIGURE 4 (PRIOR ART)
FIG. 4 is a prior art circuit used to modify the operating frequency based upon the magnitude of the CCFL current.

In the prior art, the decision to change the operating frequency was based upon the magnitude of the lamp current. As shown in FIG. 4, a comparator is used to decide whether the lamp current is less than or greater than a preset threshold. If the lamp current is less than the threshold, the signal from the output of the comparator causes the control circuitry to raise the operating frequency according to some predetermined strategy in an attempt to strike the lamp. However, there are several problems with this approach that may complicate the strategy to strike the lamp and make the startup sequence of the lamp awkward.

For example, if the threshold of the comparator is set too high, it may not be possible to use analog dimming of the lamp. In this case, a lamp current that is less than the threshold would cause the control circuitry to decide that the lamp had extinguished or broken and it would try to correct accordingly even though no fault had occurred. Another pitfall of a high comparator threshold is that the power available at the strike frequency may not be sufficient to raise the lamp current above the threshold. This could hang the control circuitry in a state where it continues to try to strike the lamp at the strike frequency even though the lamp is already conducting. Thus, the control strategy would have to account for these possibilities and somehow circumvent these pitfalls.

In the alternative, if the threshold of the comparator is set too low, this may trigger falsely. For example, this may happen because the lamp and its wiring have a small amount of stray capacitive coupling between the high and low ends of the lamp. If the current through the stray capacitance is high enough to cross the low comparative threshold, the control circuitry would be fooled into thinking the lamp had already struck and would try to switch to run mode even though the lamp was not conducting. In such a situation, it would be difficult to strike the lamp.

With respect to finding the unloaded resonant frequency, the prior art approaches suggests measuring the unloaded resonant frequency and then tuning the open lamp operating frequency accordingly using an auxiliary resistor. Other approaches use a scanning technique that seems to adapt to normal component variations across the production spread.

Independent Frequency and Loop Control

In accordance with the present invention, the inverter operating frequency is controlled independently from the regulation loops. In particular, the operating frequency is determined by a fixed frequency oscillator for normal operation after the lamp has ignited. Alternatively, the operating frequency can be locked to an external synchronization clock during normal operation. However, when the lamp is not conducting (either because it is broken or because it has not yet ignited), the operating frequency is swept higher in order to ensure adequate voltage at the output of the inverter module to strike the lamp.

In accordance with the present invention, the inverter operating frequency "tries" to run at a predetermined fixed frequency. However, if it is determined that the output current and voltage are out of phase by more than a threshold magnitude, then the "fixed" frequency control is overridden and the operating frequency is adjusted to bring the current and voltage substantially into phase. The idea of keeping the voltage and current in phase is taught in our U.S. Pat. No. 6,114,814 in the context of optimizing switch efficiency. However, it has been found in the present invention that maintaining the correct phase relationship may also be used for generating enough voltage to strike the lamp.

Hardware Implementation

Figure 5:
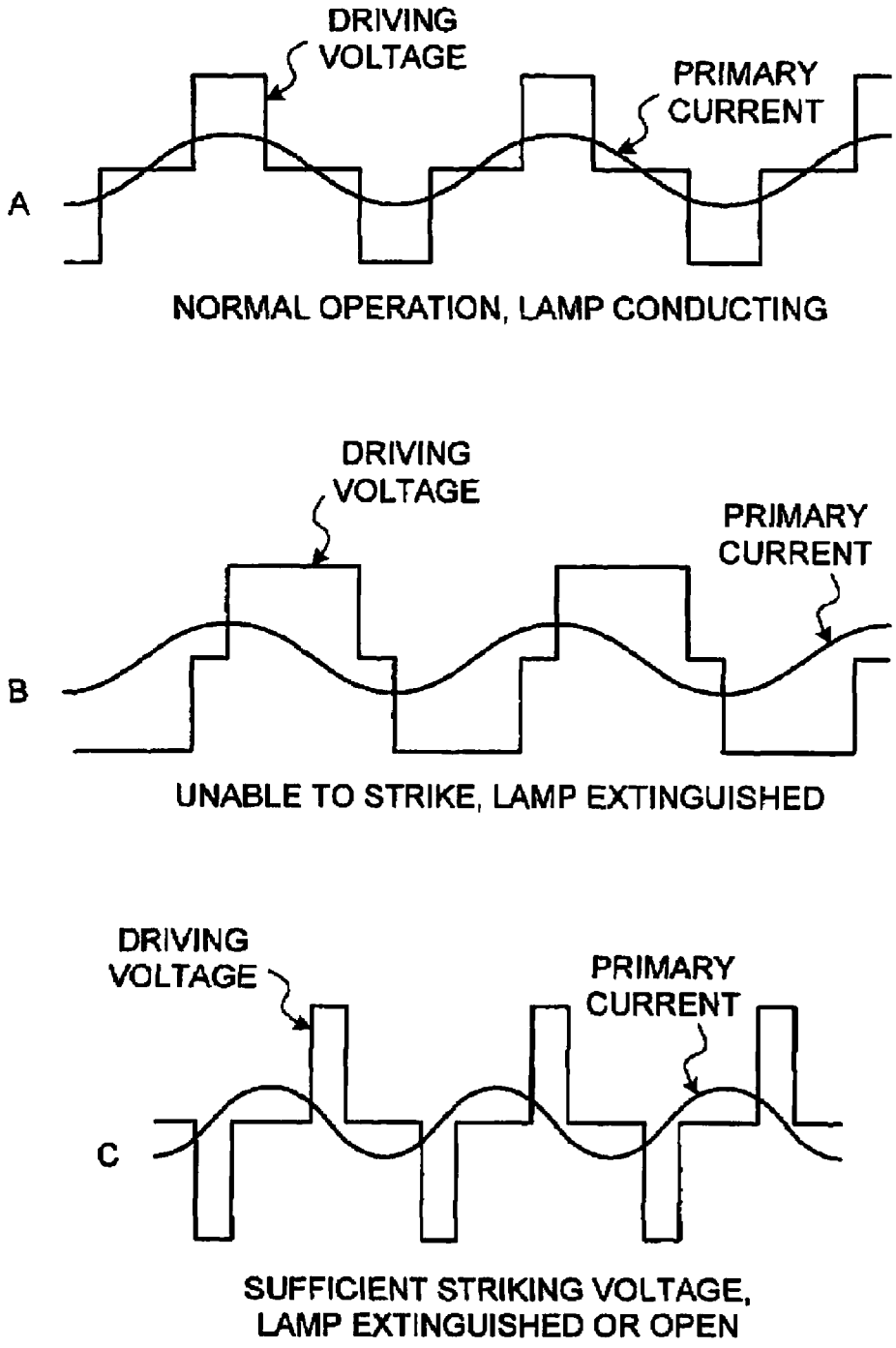
FIGS. 5A-5C are waveforms illustrating the principles of the present invention.

When the driving inverter is operating normally at point A of FIG. 3, the current across the primary winding of the transformer and the driving voltage have the relationship shown in FIG. 5A. Note that the waveforms in FIGS. 5A-5C assume that the driver is a pulse-width-modulated (PWM) full bridge. Nevertheless, the idea shown can be implemented with a PWM half bridge or a push-pull output stage as well. As seen in FIG. 5A, the voltage and current are substantially in phase. This is the criterion for setting the "fixed" operating frequency while driving a full load (the lamp is at maximum brightness).

Now consider what happens if the inverter continues to operate at the fixed frequency with a non-conducting lamp. This corresponds to point B in FIG. 3. This results in the waveforms shown in FIG. 5B. Because the operating point is significantly lower than the resonant frequency of the tank circuit, the load (lamp) at the driver appears to be capacitive and the current across the primary winding of the transformer leads the driving voltage. In this condition, it may not be possible to generate the specified strike voltage given the variations in inductor and capacitor Q. Note that in FIG. 5B, the loop has increased the pulse width of the output wave form in an attempt to force current through the lamp.

In order to guarantee a sufficient strike voltage, it is necessary to raise the operating point (i.e., frequency) to near the open lamp (unloaded) resonant frequency of the tank circuit. In other words, it is preferable to move the operating point to near point C of FIG. 3.

The waveforms for the operating point C are shown in FIG. 5C. The criterion for this case is that the current through the primary winding and the driving voltage are once again substantially in phase. The technique for ensuring this is to drive the frequency higher until the trailing edge of the voltage wave form is substantially synchronous with the falling zero crossing of the current in the primary winding. Note that the lamp voltage regulator has narrowed the output pulse width because very little power is required to maintain strike voltage across the lamp when the driving voltage and the current across the primary winding are both in phase.

There are several advantages to using the technique of maintaining the voltage and current in phase instead of switching modes when the feedback lamp current falls below a particular threshold as taught in the prior art. First, the unloaded resonant frequency of the tank circuit can be easily found and the strike frequency is close enough to resonance to ensure plenty of open-lamp voltage. Because the trailing edge of the driving voltage and the falling zero crossing of the current across the primary winding are essentially coincidental, the frequency is constrained to the capacitive side (low side) of the resonant peak and can not hop over the peak of the upper curve 303 and run away on the high side.

Another benefit is that, as soon as the lamp starts to dissipate power, the response curve of the tank circuit starts to change. The resonant peak starts moving down in frequency. In other words, the upper curve 303 slowly morphs into the lower curve 301 as you move from the unloaded condition to the loaded condition. Since the frequency controller tries to keep the operation on the capacitive side of resonance, the operating frequency starts sliding lower even before there is noticeable current in the lamp. Thus, the operating frequency remains nearly optimal throughout the start-up transient and moves towards the "fixed" operating frequency as early as possible. In other words, there is no need to detect the lamp current before leaving open lamp mode and approaching steady state run mode.

Variations on Independent Loop and Frequency Control

The phase of the output stage current may be measured at different points. In some embodiments, the voltage phase is determined by the output switch timing. The current may be measured in the output transistors as taught in U.S. Pat. No. 6,114,814. Alternatively, in the case where the output topology is a half-bridge, the voltage phase may be determined by the output switch timing and the current may be measured at the cold end of the transformer primary. Still alternatively, in the case where the output topology is a push-pull circuit driving a center-tapped transformer, the current may be measured across the on-resistance of the power switches.

The Solution

In general, the operating frequency is generated by a voltage-controlled oscillator (VCO). Alternatively, the operating frequency may be current controlled. Thus, the abbreviation VCO/ICO is used herein to identify both of these posibilities. The control input of the VCO/ICO is normally driven all the way to the low frequency of its control range or the VCO/ICO is synchronized to an external reference clock. This is the normal frequency after the lamp has been struck. The frequency is swept up higher when the falling zero crossing of the current flowing through the primary winding occurs in the second half of the driving voltage pulse. Small errors in setting the normal open frequency can be tolerated by the system because the loaded Q can be very low (Q=1), which means the phase difference between voltage and current changes very slowly with frequency.

If the lamp has not ignited (or has extinguished or has been broken), operating at the normal frequency in a system adjusted as described above will cause the phase of the current waveform to lead the voltage significantly (capacitive load). This is evidence that the operating frequency is far removed from the resonant frequency of the tank. Depending on the quality of the components comprising the tank, it may not be possible to obtain adequate voltage on the secondary to guarantee that the lamp would strike.

According to the present invention, a simple Boolean expression that compares the phase lag of the output voltage with the zero-crossing of the output current provides an error correction signal to the control node of the VCO/ICO. The VCO/ICO can then be "swept up" in frequency until the voltage and current are once more substantially in phase. In this manner, there is sufficient gain in the tank to ensure striking the lamp. Once the lamp strikes, the output voltage no longer lags the output current and the VCO/ICO sweeps down to its normal operating frequency.

Figure 6:
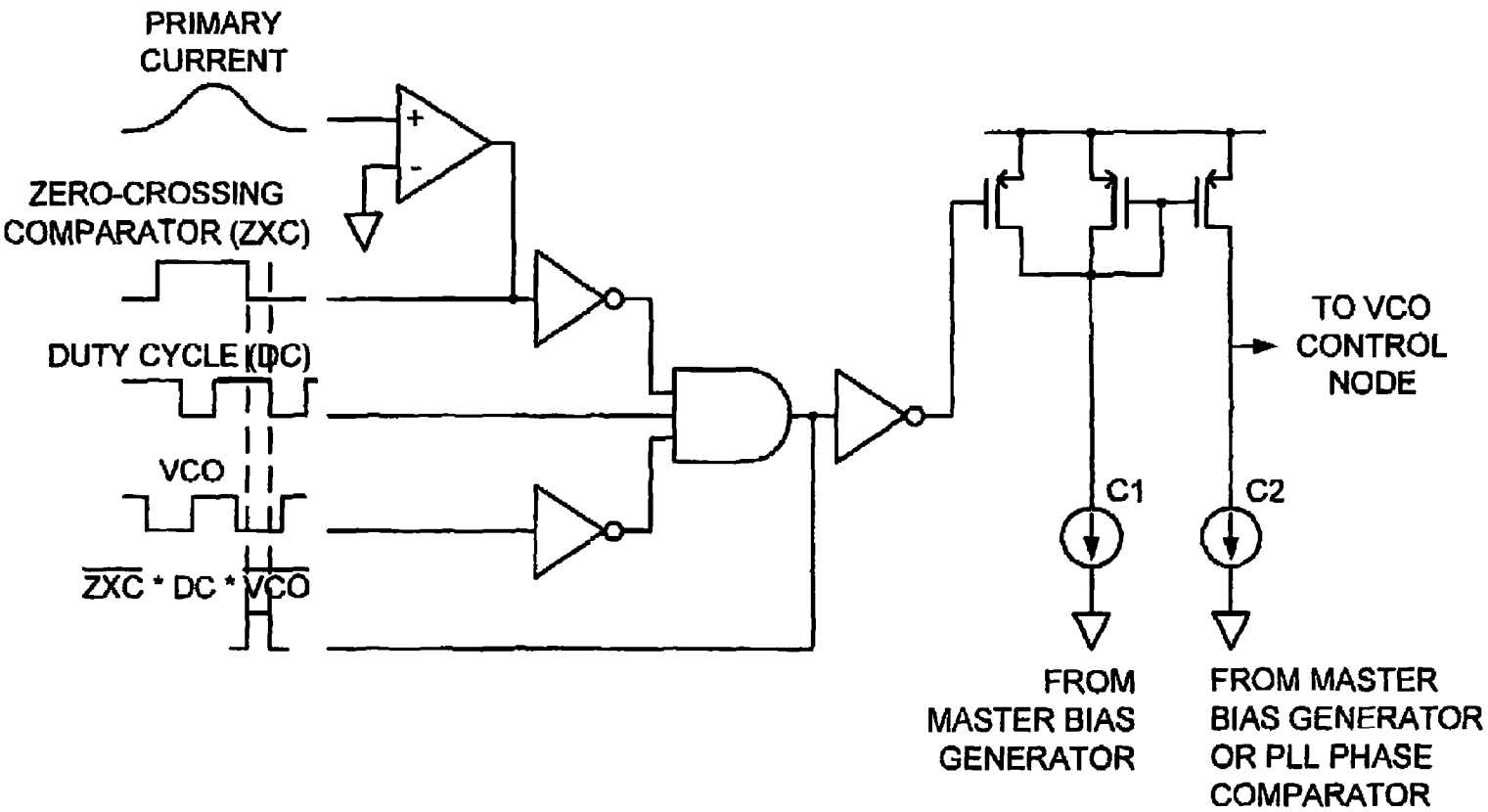
FIG. 6 is a voltage-controlled oscillator control logic used to control the operating resonant frequency of the present invention.

One example of the control logic for a VCO and pulsed current source are shown in FIG. 6. As seen, the pulsed current source C1 drives the VCO control node and is much larger in magnitude (typically greater than ten times) than the weak current sink C2. The ratio of the magnitudes of the current sink and the pulsed current source determines the phase error allowed by the frequency control loop. If it is desired to lock the operating frequency to an external clock, then the weak current sink in FIG. 6 would represent the maximum current available from the phase locked loop phase comparator block. The circuit of FIG. 6 includes Boolean logic that operates as a phase comparator.

Figure 7:
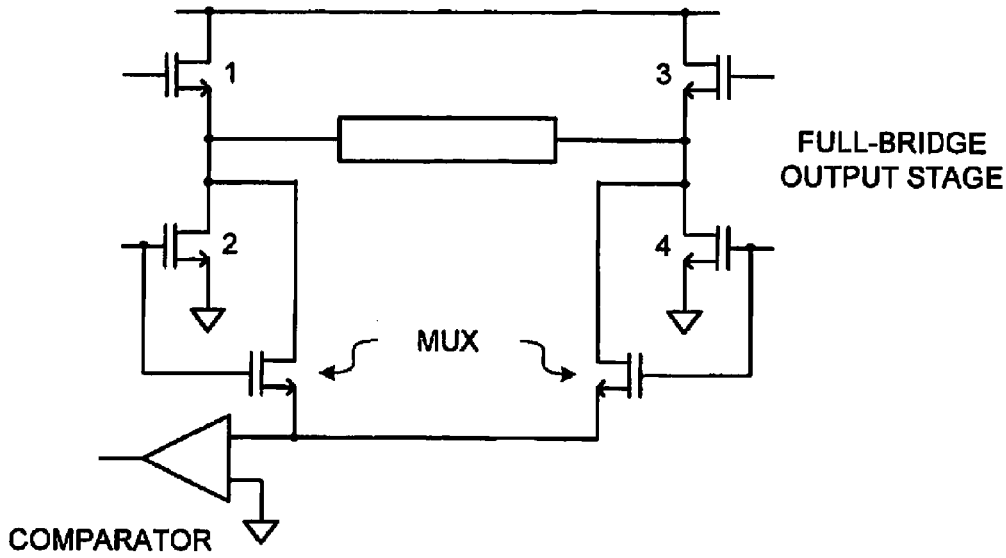
FIG. 7 shows a full bridge output stage that may be used in the present invention.
Figure 8:
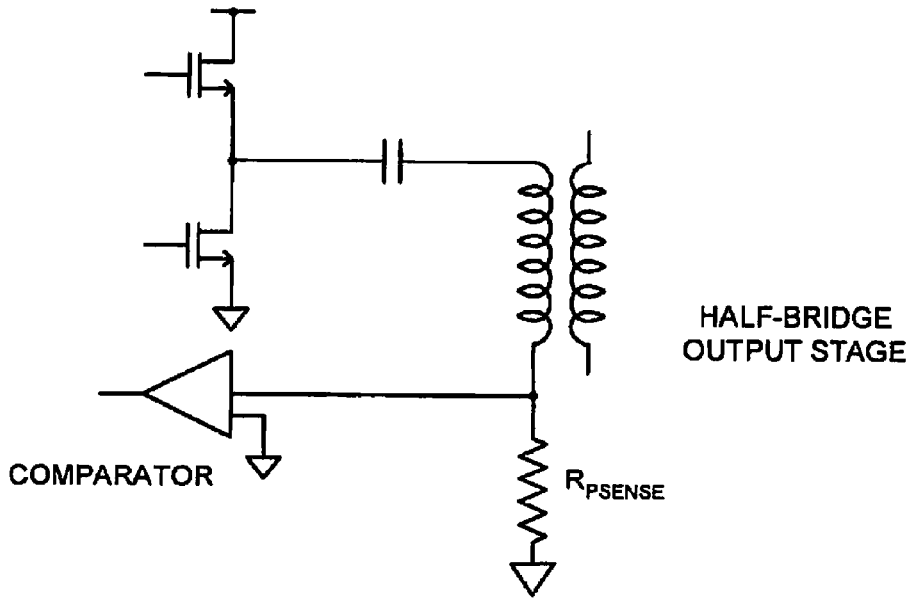
FIG. 8 shows a half bridge output stage that may be used in the present invention.
Figure 9:
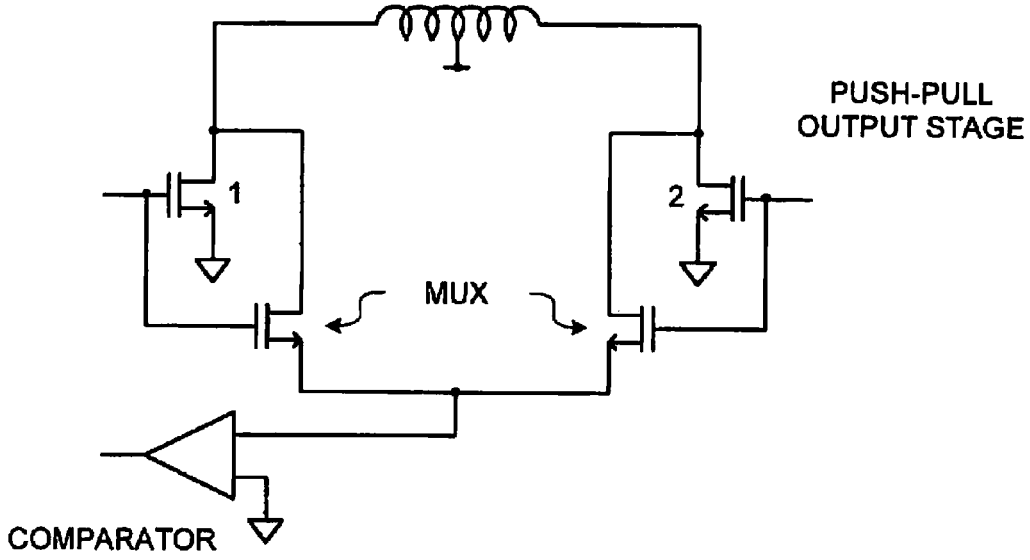
FIG. 9 shows a push-pull output stage that may be used in the present invention.

The zero-crossing detector for the current flowing in the primary winding can be configured in many different ways for the various driver-staged topologies. For example, in the case of a full bridge output stage, as seen in FIG. 7, the primary current can be sensed across the $R_{dson}$ of the switches in the bridge. The $R_{dson}$ in this example is measured across switches 2 and 4 of FIG. 7 to sense the primary current. Alternatively, in the case of a half bridge, output stage that the current in the primary winding can be sensed in the return leg of the primary winding as seen in FIG. 8 across $R_{psense}$. Finally, with appropriate blanking as seen in FIG. 9, the primary current can be sensed across the $R_{dson}$ of the switches in a push-pull output stage. The $R_{dson}$ in the example of FIG. 9 is measured across switches 1 and 2 to sense the primary current.

Figure 10:
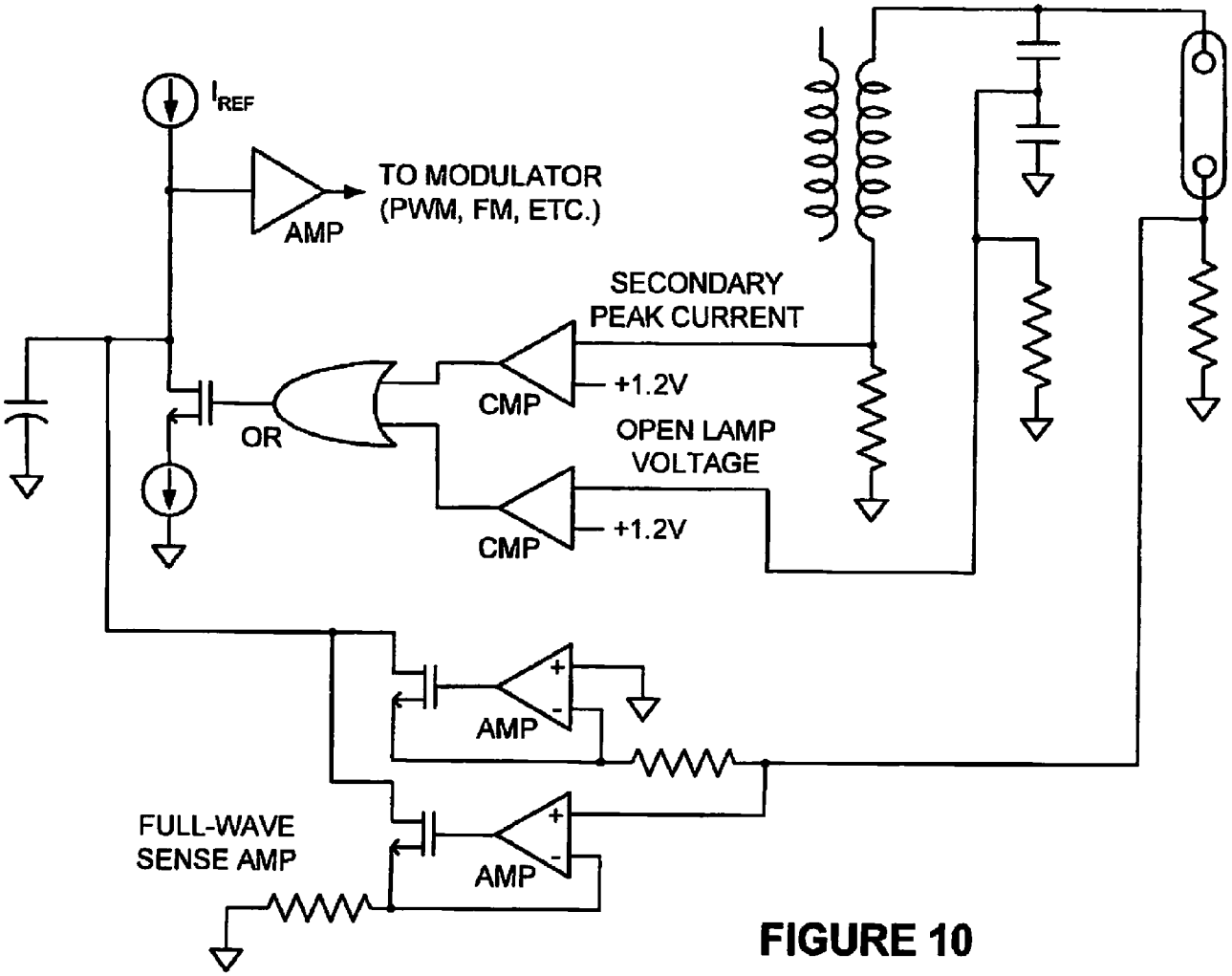
FIG. 10 shows a circuit that uses multiple feedback paths to independently optimize resonant frequency control and lamp current and voltage control.

By separating the functions of frequency control and lamp current and voltage control, both strategies can be optimized independently. For example, the circuit of FIG. 10 shows multiple feedback paths through a common pulse-width modulator that controls lamp current, open lamp voltage, and secondary current. Because all three loops use the same compensation node and modulator, the system moves smoothly from one mode to another without annoying glitches and flashes that can occur when a loop is broken and the compensation node for one parameter drifts off to an extreme of its control range.

If it is desired to synchronize the operating frequency with an external reference clock, the VCO control node can be driven with the output of a phase comparator. Under normal operating conditions with the lamp ignited, the oscillator would run near the low end of its control range. To ignite the lamp, the same logic described above overwhelms the output of the phase comparator and drives the operating frequency up to the resonant frequency of the unloaded tank.

As will be seen in further detail below, the lamp current, lamp voltage, and secondary current are maintained by closed loops independent of the operating frequency.

Configuration of Multiple Feedback Paths

It is typical in a CCFL inverter that other feedback paths are present for various reasons. In one embodiment, the multiple feedback paths converge on the same point to control various physical parameters in the system.

For example, one important feedback parameter is lamp current or lamp power. This is an important feedback path because it determines what the lamp looks like to the user and it can affect the lifetime of the lamp.

Minor feedback parameters monitor fault conditions such as open/broken lamp (maximum lamp voltage) and secondary overcurrent (shorted output). These loops are less critical than the main loop because, by definition, the lamp is not making light.

In one embodiment, all of these various feedback paths converge at the compensation (Comp) node. The advantage to this is that the voltage at the Comp node is maintained in its active region and the hand-off between the various control loops is smooth and well-behaved. Note that, if one or more of the loops did not use the common Comp node, then the Comp voltage is likely to wander off to some arbitrary voltage while a minor feedback path is in control. This would result in the feedback parameter that uses the Comp node to possibly be in error when control returns to it abruptly.

Variations on Multiple Feedback Paths

The multiple feedback path concept may be expanded to any combination of several feedback parameters and ways of combining them in any particular controller. The main feedback parameter can be either lamp current sensed in a resistor or output power computed and averaged as taught in our U.S. Pat. No. 6,114,814. Minor feedback parameters usually include lamp voltage (either balanced or unbalanced) in combination with some scheme of sensing module output current. Note that the output current does not necessarily return to the lamp current sense resistor—it may dangerously pass from the high voltage side of the transformer secondary through an unfortunate person and directly to ground. Therefore, it is necessary to find a way to measure module output current that is independent of sensing the lamp current.

In one embodiment, the current may be sensed in the transformer secondary current. In other implementations, the current is sensed in the transformer primary, measuring it in the output power switches. The current in the secondary can be inferred from the current in the primary. The short circuit current in the secondary is very nearly the current in the primary divided by the turns ratio.

Other parameters may be measured and fed back through the Comp node. For example, light output from the lamp could be measured with a photodiode and this parameter could "dither" the lamp current or power to guarantee uniform light across the production spread of panels, lamps, and modules.

The lamp current may be sensed using a full-wave sense amplifier as described in our co-pending U.S. patent application Ser. No. 10/354,541 entitled "FULL WAVE SENSE AMPLIFIER AND DISCHARGE LAMP INVERTER INCORPORATING THE SAME" filed Jan. 29, 2003 which is hereby incorporated by reference in its entirety. Further, the amplifiers and comparators at the Comp node may also use a controlled-offset technique as described in our co-pending U.S. patent application Ser. No. 10/656,087 entitled "CONTROLLED OFFSET AMPLIFIER" filed Sep. 5, 2003 which is hereby incorporated by reference in its entirety.

While the preferred embodiment of the invention has been illustrated and described, it will be appreciated that various changes can be made therein without departing from the spirit and scope of the invention.

The invention claimed is:

1. A method of driving a lamp that uses a DC to AC inverter that is connected to a winding of a transformer comprising:

(a) monitoring a phase relationship between a voltage across said winding of said transformer and a current through said winding of said transformer; and (b) keeping said phase relationship between said voltage across said winding of said transformer and said current through said winding of said transformer at substantially a predetermined relationship.

2. The method of claim 1, wherein said voltage across said winding of said transformer is substantially in phase with said current through said winding of said transformer.

3. The method of claim 1, wherein during *an* ignition of said lamp, [the] *an* operating frequency of said inverter is increased [by maintaining] *in order to maintain* said predetermined relationship between said voltage across said winding and said current through said winding.

4. The method of claim 2, wherein said voltage across said winding of said transformer is maintained substantially in phase *with said current through said winding* by using [the] *a* zero-crossing information of said current [in] *through* said winding.

5. An apparatus for driving a lamp comprising a transformer having a primary and a secondary;

[means for converting] *a circuit configured to convert* a DC power into AC power [and operating at a frequency, the means for converting driving the primary], *wherein the circuit is configured to operate at a frequency and drive the primary* of said transformer;

means for *monitoring* phase [comparison that monitors a phase relationship] between a voltage across said primary of said transformer and a current through said primary of said transformer; and means for *adjusting* frequency [control that adjusts the frequency] of said [means for converting] *circuit* such that [said] *a* phase relationship between said voltage across said primary of said transformer and said current through said primary of said transformer is maintained at substantially a predetermined relationship.

6. The apparatus of claim 5, further including a voltage controlled oscillator that is responsive to said means for *adjusting* frequency [control] and *configured* to output an oscillation used by said [means for converting] *circuit* to generate said frequency.

7. The apparatus of claim 5, wherein [said means for phase comparison and said means for frequency control operate to maintain said phase relationship as being substantially in phase] *said voltage across said winding of said transformer is maintained at substantially in phase with said current through said winding of said transformer*.

8. The apparatus of claim 5 wherein said means for phase [comparison] further includes a zero-crossing detector for monitoring said current through said primary.

*9. A method of driving a lamp that uses a DC to AC inverter that is coupled to a transformer having a primary and a secondary, the method comprising:*

*(a) determining a phase relationship between a voltage across either the primary or the secondary of the transformer and a current through either the primary or the secondary of the transformer; and*

(b) keeping the phase relationship between the voltage across either the primary or the secondary of the transformer and the current through either the primary or the secondary of the transformer at a substantially predetermined relationship.

10. The method of claim 9, wherein the voltage across either the primary or the secondary of the transformer is substantially in phase with the current through either the primary or the secondary of the transformer.

11. The method of claim 9, wherein during an ignition of the lamp, an operating frequency of the inverter is increased in order to maintain the substantially predetermined relationship between the voltage across either the primary or the secondary of the transformer and the current through either the primary or the secondary of the transformer.

12. The method of claim 10, wherein the voltage across either the primary or the secondary of the transformer is maintained substantially in phase with the current through either the primary or the secondary of the transformer by using a zero-crossing information of the current through either the primary or the secondary of the transformer.

13. The method of claim 11, wherein the operating frequency is increased to a strike frequency.

14. A method of striking a lamp comprising:

determining a phase relationship between a voltage across a transformer and a current through the transformer; and sweeping a frequency of a signal applied to the transformer to a strike frequency based on the phase relationship between the voltage across the transformer and the current through the transformer.

15. The method of claim 14, wherein determining the phase relationship between the voltage across the transformer and the current through the transformer comprises:

determining a phase relationship between a voltage across either a primary or a secondary of the transformer and a current through either a primary or a secondary of the transformer.

16. The method of claim 15, wherein sweeping the frequency of the signal applied to the transformer to the strike frequency based on the phase relationship between the voltage across the transformer and the current through the transformer comprises:

sweeping the frequency of the signal applied to the primary of the transformer to a strike frequency when the voltage across either the primary or the secondary of the transformer is not substantially in phase with the current through either the primary or the secondary of the transformer.

17. The method of claim 16 further comprising: changing from the strike frequency to a normal operating frequency.

18. The method of claim 17, wherein changing from the strike frequency to the normal operating frequency occurs when the voltage across either the primary or the secondary of the transformer is substantially in phase with the current through either the primary or the secondary of the transformer.

19. A method of converting a DC input voltage to an AC signal for driving a lamp, comprising:

controllably switching the DC input voltage ON and OFF to generate an AC signal;

monitoring two or more signals, wherein the two or more signals comprise at least a drive voltage signal and a drive current signal;

determining a phase relationship between the drive voltage signal and the drive current signal to generate a control signal; and controlling a frequency of the AC signal based on the control signal.

20. The method of claim 19, wherein the two or more signals further comprise either a lamp current signal or a lamp voltage signal.

21. The method of claim 20 further comprising: controlling the frequency of the AC signal based on either the lamp current signal or the lamp voltage signal.

22. The method of claim 19, wherein controlling a frequency of the AC signal based on the control signal comprises:

sweeping a frequency of the AC signal to a strike frequency when the control signal indicates the phase relationship between the drive voltage signal and the drive current signal is not substantially in phase; and changing from the strike frequency to a normal operating frequency when the control signal indicates the phase relationship between the drive voltage signal and the drive current signal is substantially in phase.

23. A method comprising:

receiving a DC voltage;

generating one or more switching signals;

generating an AC signal from the DC voltage based on the switching signals;

monitoring two or more signals, wherein the two or more signals comprise at least a drive voltage signal and a drive current signal;

determining a phase relationship between the drive voltage signal and the drive current signal to generate a control signal; and sweeping a frequency of the AC signal based on the control signal.

24. The method of claim 23, wherein determining a phase relationship between the drive voltage and the drive current signal to generate the control signal comprises:

determining a phase relationship between the drive voltage and a zero crossing of the drive current signal to generate a control signal.

25. The method of claim 23, wherein sweeping a frequency of the AC signal comprises:

increasing the frequency to a strike frequency when the control signal indicates the phase relationship is not substantially in phase.

26. The method of claim 25, further comprising:

changing the frequency from the strike frequency to a normal operating frequency when the control signal indicates the phase relationship is substantially in phase.

27. An inverter circuit for driving a lamp, the circuit comprising:

one or more switches to controllably switch an input voltage ON and OFF to generate an AC signal; and a control circuit configured to:

monitor a drive voltage signal and a drive current signal, determine a phase relationship between the drive voltage signal and the drive current signal to generate a control signal, and control a frequency of the AC signal based on the control signal.

28. The inverter circuit of claim 27, wherein the control circuit is further configured to determine a phase relationship between the drive voltage signal and a zero crossing of the drive current signal to generate the control signal.

29. The inverter circuit of claim 27, wherein the control circuit is further configured to increase the frequency of the AC signal to a strike frequency when the control signal indicates the phase relationship is not substantially in phase.

*30. The inverter circuit of claim 29, wherein the control circuit is further configured to change the frequency from the strike frequency to a normal operating frequency when the control signal indicates the phase relationship is substantially in phase.*

*31. An integrated inverter controller comprising:*

*a first circuit configured to monitor at least two or more signals, wherein the two or more signals comprise at least a drive voltage signal and a drive current signal;*

*a second circuit configured to determine a phase relationship between the drive voltage signal and the drive current signal to generate a control signal;*

*a third circuit configured to control the frequency of an AC signal based on the control signal.*

*32. The integrated inverter controller of claim 31, wherein the third circuit is further configured to: sweep the frequency of the AC signal when the control signal indicates the phrase relationship is not substantially in phase.*

*33. The integrated inverter controller of claim 31, wherein the AC signal is externally generated by controllably switching a DC input voltage ON and OFF.*

*34. The integrated inverter controller of claim 31, wherein the third circuit is further configured to increase the frequency of the AC signal to a strike frequency when the control signal indicates the phase relationship is not substantially in phase.*

*35. The integrated inverter controller of claim 34, wherein the third circuit is further configured to change the frequency from the strike frequency to a normal operating frequency when the control signal indicates the phase relationship is substantially in phase.*

*36. The integrated inverter controller of claim 31, wherein the two or signals further comprise either a lamp voltage signal or a lamp current signal.*

*37. An inverter controller for driving a lamp, the controller comprising:*

*a first circuit configured to monitor at least two or more signals, wherein the two or more signals comprise at least a drive voltage signal and a drive current signal;*

*a second circuit configured to determine a phase relationship between the drive voltage signal and the drive current signal to generate a control signal;*

*a third circuit configured to control the frequency of an AC signal based on the control signal.*

*38. The inverter controller of claim 37, wherein the third circuit is further configured to sweep the frequency of the AC signal when the control signal indicates the phase relationship is not substantially in phase.*

*39. The inverter controller of claim 37, wherein the AC signal is externally generated by controllably switching a DC input voltage ON and OFF.*

*40. The inverter controller of claim 37, wherein the third circuit is further configured to increase the frequency of the AC signal to a strike frequency when the control signal indicates the phase relationship is not substantially in phase.*

*41. The inverter controller of claim 40, wherein the third circuit is further configured to change the frequency from the strike frequency to a normal operating frequency when the control signal indicates the phase relationship is substantially in phase.*

*42. The inverter controller of claim 41, wherein the two or signals further comprise either a lamp voltage signal or a lamp current signal.*

* * * * *